US012410647B2

(12) United States Patent
Weaver

(10) Patent No.: US 12,410,647 B2
(45) Date of Patent: Sep. 9, 2025

(54) DOOR STOP MECHANISM

(71) Applicant: Clopay Corporation, Mason, OH (US)

(72) Inventor: Edward Leonard Weaver, Milford, OH (US)

(73) Assignee: Clopay Corporation, Mason, OH (US)

( * ) Notice: Subject to any disclaimer, the term of this patent is extended or adjusted under 35 U.S.C. 154(b) by 358 days.

(21) Appl. No.: 17/963,399

(22) Filed: Oct. 11, 2022

(65) Prior Publication Data

US 2024/0117660 A1 Apr. 11, 2024

(51) Int. Cl.
*E05D 13/00* (2006.01)

(52) U.S. Cl.
CPC ........ *E05D 13/006* (2013.01); *E05D 13/1215* (2013.01); *E05D 13/1223* (2013.01); *E05Y 2201/47* (2013.01)

(58) Field of Classification Search
CPC ............ E05D 13/1215; E05D 13/1223; E05D 13/003; E05D 13/006; E05Y 2201/47
See application file for complete search history.

(56) References Cited

U.S. PATENT DOCUMENTS

| | | | | |
|---|---|---|---|---|
| 2,093,020 A * | 9/1937 | Norberg | E05D 13/006 160/40 |
| 4,368,770 A * | 1/1983 | Ulfhielm | E06B 9/0653 160/84.02 |
| 4,860,813 A | 8/1989 | Ballyns et al. | |
| 4,914,862 A * | 4/1990 | Gregory | E05D 13/006 49/445 |
| 5,404,924 A | 4/1995 | Yuze | |
| 6,042,158 A * | 3/2000 | Horn | E05D 13/006 292/DIG. 36 |
| 6,485,068 B1 * | 11/2002 | Sauve | E05F 15/665 292/171 |
| 6,715,236 B2 * | 4/2004 | Mullet | E05D 13/006 49/197 |
| 7,028,371 B2 * | 4/2006 | VerSteeg | E05D 13/1207 49/181 |
| 9,487,987 B2 * | 11/2016 | Baczweski | E05D 15/445 |
| 9,856,112 B1 * | 1/2018 | Cirone | B66B 5/12 |
| 2003/0051409 A1 | 3/2003 | Bruns | |
| 2019/0153760 A1 * | 5/2019 | Royse | E05D 13/1238 |

FOREIGN PATENT DOCUMENTS

| | | | | |
|---|---|---|---|---|
| DE | 202016005120 U1 * | 10/2016 | |
| EP | 0149692 A1 * | 1/1984 | |
| EP | 3748112 A1 * | 12/2020 | E05D 13/006 |
| EP | 3608493 B1 | 2/2022 | |
| WO | 2020260125 A1 | 12/2020 | |

OTHER PUBLICATIONS

International Search Report and Written Opinion mailed in corresponding PCT Application No. PCT/US2022/046235 on Jan. 18, 2023.

* cited by examiner

*Primary Examiner* — Abe Massad

(57) ABSTRACT

An example door stop mechanism is provided. The door stop mechanism includes a body, a connection member, a spring, and a brake. The spring is coupled to the body and the connection member. The brake is positioned adjacent to the body. The brake moves between an engaged position via a spring force of the spring that causes the body to interact with the brake such that the brake contacts a track of an overhead door and an disengaged position via a force that acts against the spring force to pull the body away from the brake such that the brake moves away from the track to allow the overhead door to move.

18 Claims, 9 Drawing Sheets

DOOR STOP MECHANISM

BACKGROUND

Overhead doors to cover external and internal openings may comprise panel sections that are connected by hinges. An overhead door can be raised into an open position and lowered to a closed position through rollers in a track system. The track system has a vertical section mounted to a wall, and a horizontal section mounted to a ceiling or overhead structure. In addition to the track system, a cable or strap system interacts with a counterbalance system comprising a torsion spring bar. The torsion spring bar comprises a torsion spring and cable drums located on each end of the torsion spring bar. The cable drum is connected to a first end of a cable or strap, and the second end of the cable or strap is attached to a bottom bracket, which is mounted to the bottom-most panel of the door.

DETAILED DESCRIPTION

Examples described herein provide examples of a door stop mechanism for an overhead door. As discussed above, an overhead door can include a cable or strap system to help open and close the panels of the overhead door. One issue with cable or strap systems for overhead doors is that the tension of the cable or strap should be consistent so as not to cause misalignment or prohibit movement of panels of the overhead door when opened or closed.

In some instances, when the door is closing, there may be a point where the door is in a vertical section of the track and moved by gravity. Only the strap being controlled by the torsion spring bar controls the descending velocity of the overhead door. An uncontrolled descending velocity of the moving panels of the overhead door may be undesirable, and reliable means to arrest the movement of the overhead door is therefore desired.

The present disclosure provides a door stop mechanism to stop movement of the overhead door when tension in the strap is lost. For example, while tension in the strap is maintained, the door stop mechanism may be disengaged to allow the door to move freely within the track system. When tension in the strap is lost, the door stop mechanism may be moved into an engaged position to prevent the door from moving until the strap is replaced or tension in the strap is restored.

In an example, the door stop mechanism may include a braking system that engages the track. The braking system may use friction to "catch" the track and prevent movement of the overhead door.

The door stop mechanism of the present disclosure may provide a low-cost solution to arresting movement of overhead doors when tension in the strap is lost. The door stop mechanism of the present disclosure may also be retrofitted to existing overhead doors and provide a relatively low profile and clean design.

Figure 1:
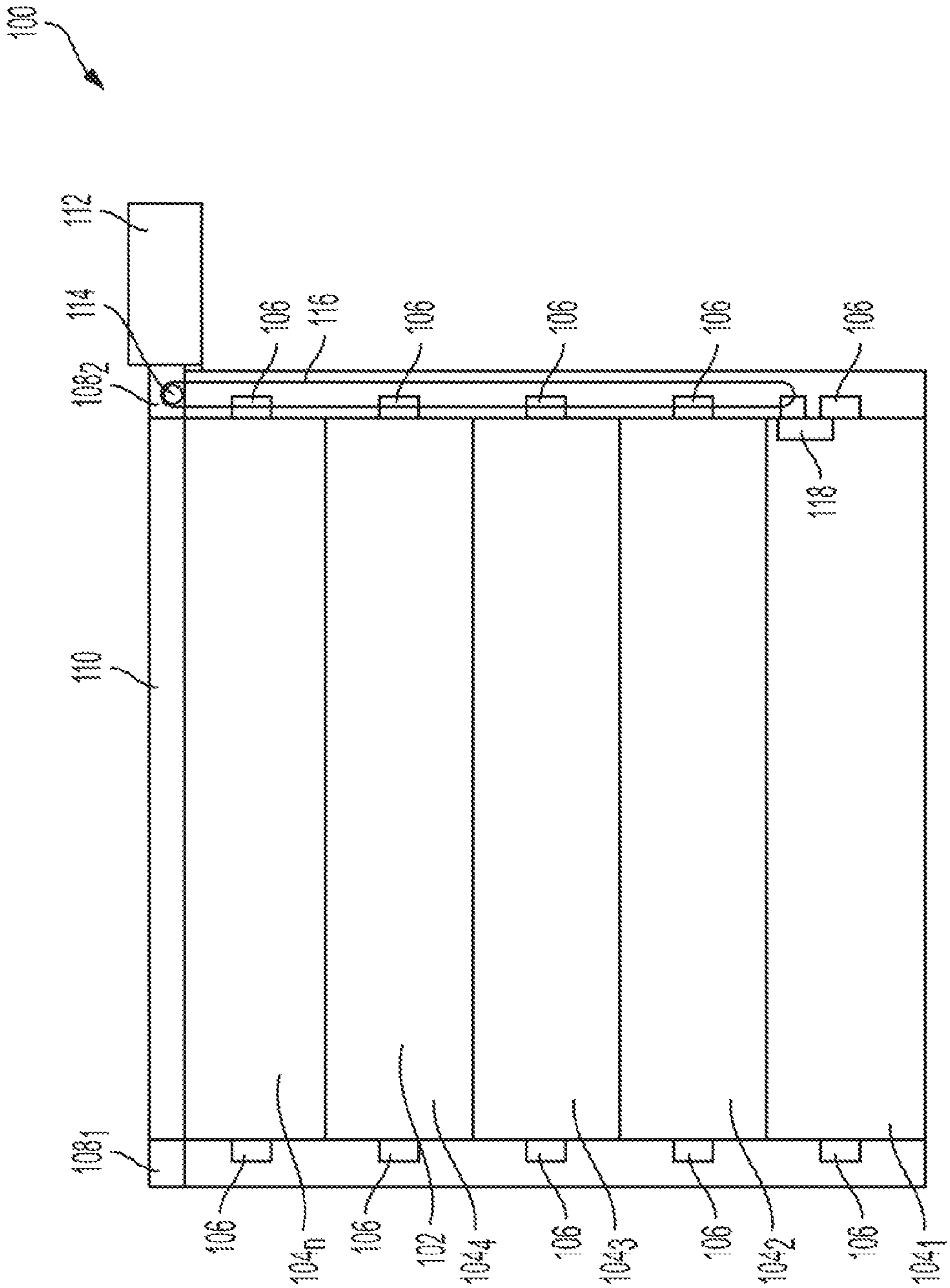
FIG. 1 is a block diagram of an overhead door with an example door stop mechanism of the present disclosure.

FIG. 1 illustrates an interior front view of an overhead door system 100 with door stop mechanism 118 of the present disclosure. FIG. 1 illustrates a view of the overhead door system 100 with a door 102 in the closed positioned.

In one embodiment, the overhead door system 100 includes the door 102. The door 102 may be comprised of a plurality of panels $\mathbf{104}_1$ to $\mathbf{104}_n$ (hereinafter also referred to individually as a panel 104 or collectively as panels 104). The panels 104 may be vertically arranged. In some embodiments, the panels 104 may be movably coupled via panel fasteners or hinges (not shown) or may be disconnected from one another.

The panels 104 may be constructed of the same materials or different materials. In one embodiment, each panel 104 may be a metal frame structure without a middle panel (e.g., an open panel). The metal frame structure may comprise at least two vertical stiles and at least two horizontal stiles connected at right angles. The metal frame may further comprise a third vertical stile, a fourth vertical stile, a fifth vertical stile, and a sixth vertical stile forming multiple middle areas defined by the metal frame structure. The middle areas of this metal frame can be open, may comprise a solid metal panel, may comprise an open metal structure (e.g., screen, grid, grate, woven metal structure, or the like), may comprise a polyacrylate panel that is clear or translucent, may comprise polymethylmethacrylate (PMMA) that is clear or translucent, may comprise a polypropylene panel that is clear or translucent, may comprise a glass panel that is clear or translucent, or may comprise a laminate structure that is intended to have impact resistance.

In one embodiment, the overhead door system 100 may include a track system that includes a first track $\mathbf{108}_1$ and a second track $\mathbf{108}_2$ that are oriented parallel to each other and located adjacent to the ends of each panel. The door 102 may be guided into an open and closed position via the first track $\mathbf{108}_1$ and the second track $\mathbf{108}_2$. For example, wheels 106 or other mechanical means (not shown) may be coupled to the ends of each panel 104. The wheels 106 may be fitted inside of the first track $\mathbf{108}_1$ and the second track $\mathbf{108}_2$. As the door 102 is opened and closed, the wheels 106 may travel along the first track $\mathbf{108}_1$ and the second track $\mathbf{108}_2$.

In one embodiment, the overhead door system 100 may include a shaft 110 that is located over the door 102. The shaft 110 may be coupled to a gear box 114 on one or both ends of the shaft 110, and to a motor 112. The gearbox 114 may be coupled to an end of the shaft 110. The motor 112 may cause the shaft 110 to rotate and assist in the movement of the door 102 between an open position and a closed position. A drum or spool may be coupled to the ends of the shaft 110 or coupled to the gear box 114.

In one embodiment, a connection member 116 may be coupled to a portion of the spool or drum (shown in FIG. 8) and the door stop mechanism 118. The connection member 116 may be a strap or a cable. A strap may be fabricated from fabric or metal and may have a flat or ribbon shape. A cable may be fabricated from steel and have a cylindrical shape.

In one embodiment, FIG. 1 illustrates an example where the connection member 116 is a strap (hereinafter also referred to as the strap 116). The strap 116 may be oriented such that a width of the strap 116 is parallel to a width of the track $\mathbf{108}_1$ and/or $\mathbf{108}_2$. The drum may be selected to be concentrically aligned with the shaft 110, allowing for the spooling of the strap 116, or may be a gear box that allows for the strap to be oriented parallel to a width of the track $\mathbf{108}_1$ and/or $\mathbf{108}_2$. Further details of how the strap 116 is coupled to the drum and the door stop mechanism 118 are discussed in further detail below.

Although a single door stop mechanism 118 and single strap 116 are illustrated in FIG. 1, it should be noted that the overhead door system 100 may include two door stop mechanisms 118 and two straps 116. For example, a door stop mechanism 118 and a strap 116 may be deployed on each end of the door 102.

In one embodiment, the doorstop mechanism 118 may be positioned only on a bottom most panel $\mathbf{104}_1$. As discussed in further detail below, the tension in the strap 116 may control whether the door stop mechanism 118 is engaged or disengaged. When tension in the strap 116 is lost, the door stop mechanism 118 may move to an engaged position that arrests movement of the door 102 or arrests movement of the panels 104 within the tracks $\mathbf{108}_1$ and $\mathbf{108}_2$. When tension in the strap 116 is maintained, the door stop mechanism 118 may move to a disengaged position that allows door 102 to move freely within the tracks $\mathbf{108}_1$ and $\mathbf{108}_2$.

In one embodiment, the strap 116 may be tightened to have an initial amount of tension to keep the door stop mechanism 118 in a disengaged position. Tension in the strap 116 may be lost when the amount of tension becomes less than the initial amount of tension that was set in the strap 116. Tension may be lost in the strap 116 over time due to stretching of the strap 116, movement or slight separation of the panels 104, misalignment of the door 102 within the tracks $\mathbf{108}_1$ and $\mathbf{108}_2$, and the like.

Figure 2:
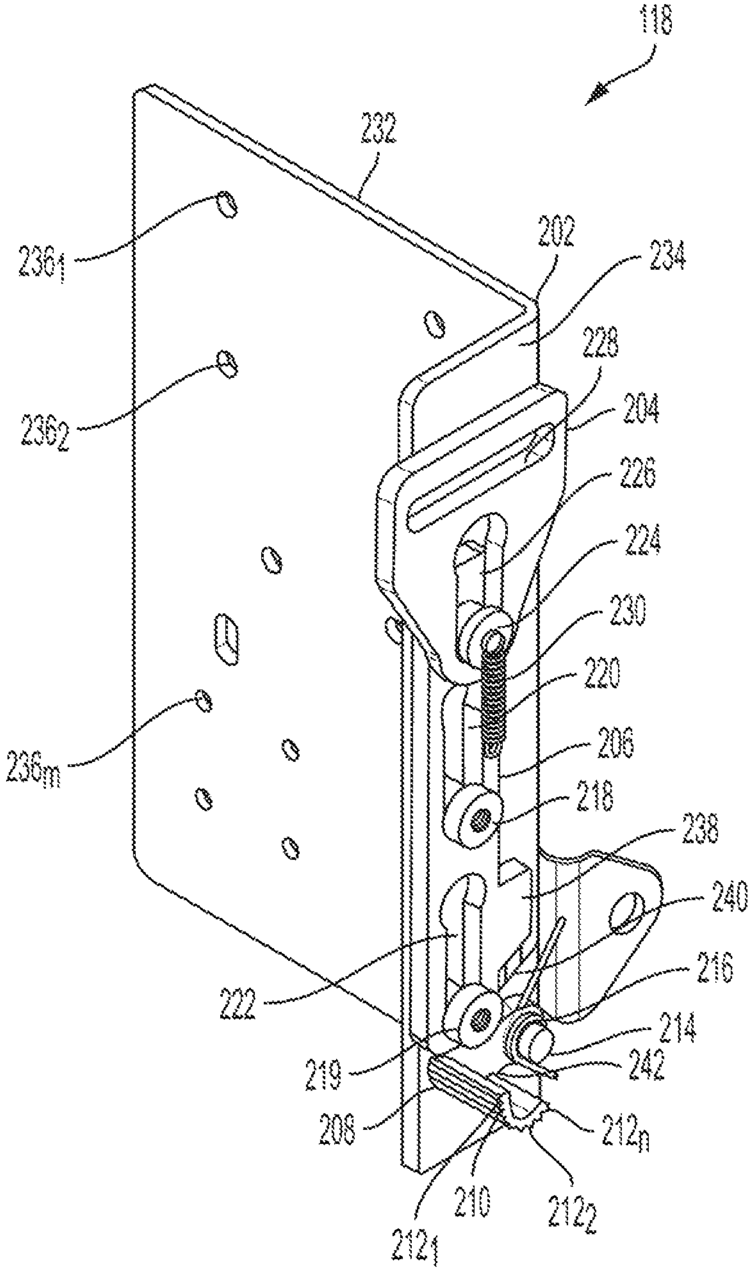
FIG. 2 is an isometric view of an example door stop mechanism in a disengaged position of the present disclosure.

FIG. 2 illustrates an isometric view of an example door stop mechanism 118. In one embodiment, the door stop mechanism 118 may include a strap connection member 204, a body 206, and a brake 208. The strap connection member 204, the body 206, and the brake 208 may be coupled together mechanically via a combination of protruding members 218, 219, and 224 inserted into slots 226, 220, and 222 and a spring 230. The strap connection member 204, the body 206, and the brake 208 may be coupled to a bracket 202.

In one embodiment, bracket 202 may include a first side 232 and a second side 234. The first side 232 and the second side 234 may be coupled together at a right angle, perpendicularly, or at approximately 90 degrees. The first side 232 and the second side 234 may be formed from a single piece of metal or sheet metal. The first side 232 may include one or more openings $\mathbf{236}_1$ to $\mathbf{236}_m$ to couple the bracket 202 to a bottom most panel $\mathbf{104}_1$ of the door 102, illustrated in FIG. 1. A mechanical fastener (e.g., a screw, a nut and bolt, a pin, and the like) may be inserted into each of the openings $\mathbf{236}_1$ to $\mathbf{236}_m$ and into corresponding openings (not shown) in the bottom most panel $\mathbf{104}_1$ to secure the bracket 202 to the bottom most panel $\mathbf{104}_1$.

In one embodiment, the body 206 may be coupled to the second side 234 of the bracket 202. For example, the second side 234 may include the protruding members 218 and 219. The protruding members 218 and 219 may each have a cylindrical shape with a cylindrical body that has a smaller diameter than the cylindrical head. The body 206 may include slots 220 and 222. The slots 220 and 222 may include a first portion that matches a diameter of the cylindrical heads of the protruding members 218 and 219. The slots 220 and 222 may include a second portion that is smaller in diameter or width than the first portion that matches the diameters of the cylindrical bodies of the protruding members 218 and 219.

The protruding member 218 may be inserted into the slot 220, and the protruding member 219 may be inserted into the slot 222. The cylindrical bodies of the protruding members 218 and 219 may move within the second portions of the slots 220 and 222. The larger diameters of the cylindrical heads of the protruding members 218 and 219 may keep the bodies 206 secured against the second side 234 of the bracket 202.

The body 206 may include a protruding member 224. The protruding member 224 may have similar dimensions and features to the dimensions and features of the protruding members 218 and 219 (e.g., the cylindrical body and a larger cylindrical head). The strap connection member 204 may include a slot 226. The slot 226 may have a similar size and similar features to the sizes and features of the slots 220 and 222 (e.g., a first portion with a larger diameter and a second portion with a smaller diameter).

The strap connection member 204 may be coupled to the body 206 by inserting the protruding member 224 through the slot 226, similar to how the protruding members 218 and 219 are inserted into the slots 220 and 222. The strap connection member 204 may be secured to the body 206 via a spring 230. The spring 230 may be coupled to the protruding member 224 and to the protruding member 218 via a screw or other type of mechanical fastener.

In one embodiment, the protruding members 218, 219, and 224 may be aligned vertically on the second side 234 of the bracket 202. In other words, centers of the protruding members 218, 219, and 224 may lie on a common vertical line that would run parallel to an edge of the second side 234. The amount of movement of the strap connection member 204 and the body 206 may be defined by lengths of the slots 220, 222, and 226.

In one embodiment, the spring 230 may be loaded to pull the strap member 204 downwards. In other words, the spring 230 may be loaded to move the strap connection member 204 closer to the protruding member 218.

The strap connection member 204 may also include a slot 228. The strap 116 may be fed through the slot 228. As noted above, when tension is applied to the strap 116, the tension in the strap 116 may act against the spring 230 and move the strap connection member 204 in an upward direction. In other words, the tension in the strap 116 may pull the strap connection member 204 away from the protruding member 218. As a result, the bottom of the slot 226 may pull up against the protruding member 224 on the body 206 and move the body 206 upwards. The upward movement of the body 206 may move the brake 208 into a disengaged position.

Figure 3:
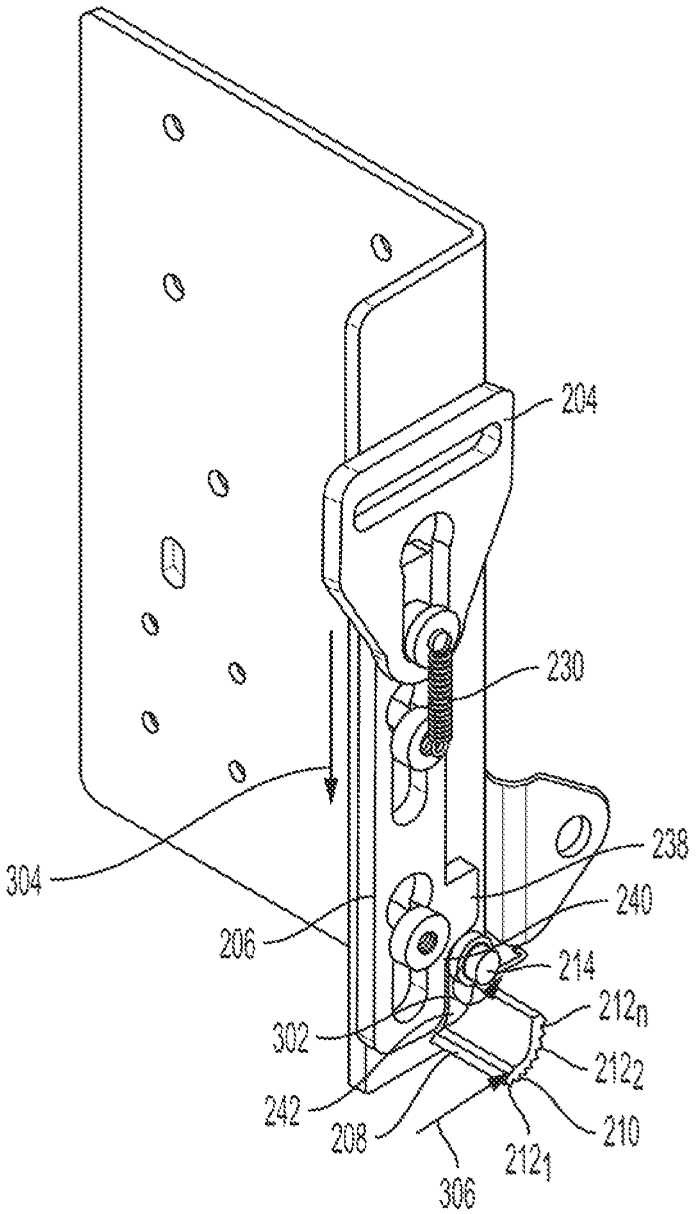
FIG. 3 is an isometric view of the example door stop mechanism in an engaged position of the present disclosure.
Figure 6:
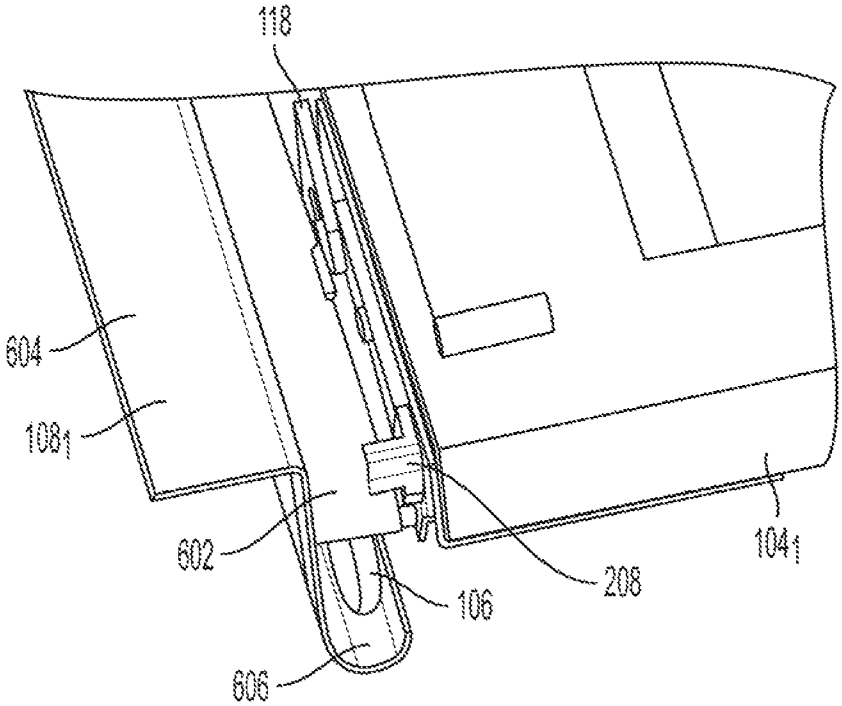
FIG. 6 is an isometric view of the example door stop mechanism of the present disclosure on a panel of the overhead door relative to a track and in in a disengaged position.
Figure 7:
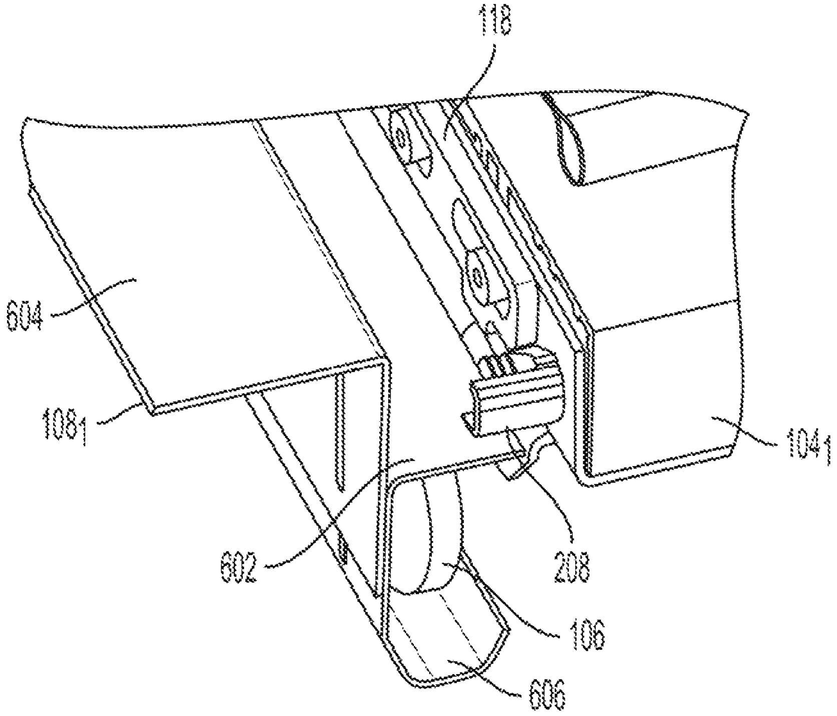
FIG. 7 is an isometric view of the example door stop mechanism of the present disclosure on a panel of the overhead door relative to a track and in in an engaged position.

When the tension in the strap 116 is lost, the force of the spring 230 may overcome the remaining tension in the strap 116 and cause the strap connection member 204 to move towards the protruding member 218. This causes the slot 226 to move lower, thereby allowing the slots 220 and 222 to also move lower against the protruding members 218 and 219, respectively. This may cause the body 206 to move in a downward direction. The downward movement of the body 206 may move the brake 208 into an engaged position. FIGS. 3, 6, and 7 illustrate further details of how the brake 208 is moved between the disengaged and engaged position.

In one embodiment, the brake 208 may be rotatably coupled to the second side 234 of the bracket 202. The brake 208 may include a pivot member 214 that is inserted into an opening on the second side 234 (shown in FIG. 4). The brake 208 may be secured via a torsion spring 214 that is wrapped around the pivot member 214. The torsion spring 214 may be loaded to cause the brake 208 to move away from the external surface of the track $108_1$ or $108_2$ into a disengaged position.

Figure 5:
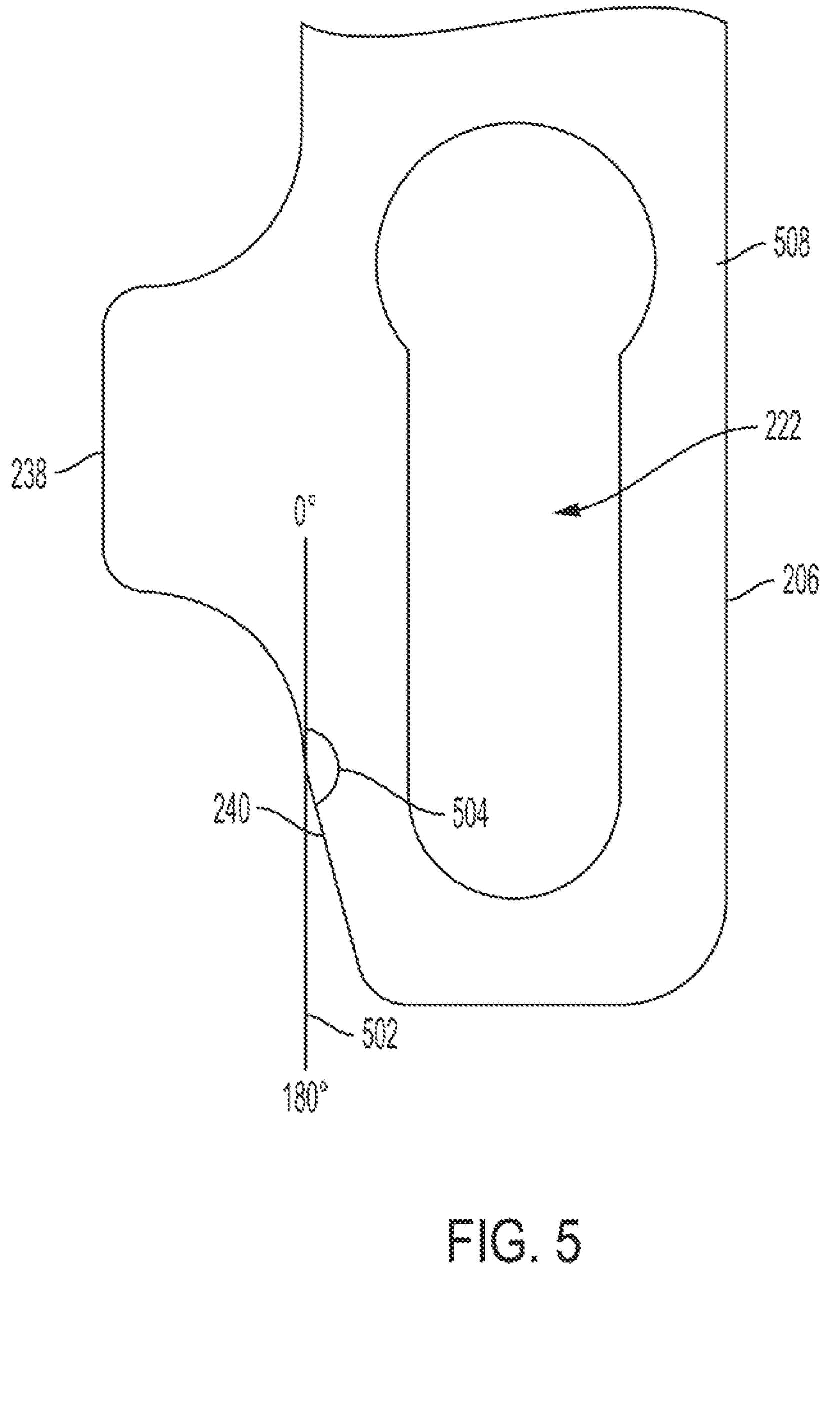
FIG. 5 is an side view of a bracket of the example door stop mechanism of the present disclosure.

In one embodiment, the brake 208 may include an arm 242 that is coupled to the pivot member 214. The arm 242 may interact with a cam surface 240 of a cam 238 of the body 206. The cam surface 240 may be inclined or formed at an angle to properly interact with the arm 242, as illustrated in FIG. 5, and discussed in further detail below. As the body 206 moves upward and downward, the cam surface 240 may move away from the arm 242 or move against the arm 242. When the cam surface 240 does not contact the arm 242, the torsion spring 214 may cause the pivot member 214 and the arm 242 to rotate clockwise and to move the brake 208 into a disengaged position. When the cam surface 240 acts upon the arm 242, the cam surface 240 may apply a force that overcomes the force applied by the torsion spring 214. This may cause the pivot member 214 to rotate in a counter clockwise direction as the cam surface 240 moves further downward against the arm 242. The counter clockwise rotation of the pivot member 214 may cause the brake 208 to move to an engaged position.

In one embodiment, the brake 208 may have a curved outer braking surface 210. The surface 210 may be curved along a single axis of the surface. For example, the curved outer braking surface 210 may be formed by curving a rectangular surface around a horizontal axis or around the pivot member 214. Said another way, the curved outer braking surface 210 may appear as a section cut away from a curved surface of a cylinder.

The curved outer braking surface 210 may face the tracks $108_1$ and/or $108_2$. The curved outer braking surface 210 may include a plurality of contact points $212_1$ to $212_n$ (hereinafter also referred to individually as a contact point 212 or collectively as contact points 212). The contact points 212 may provide multiple surfaces that can "catch" the surface of the track $108_1$ or $108_2$. Thus, the multiple contact points 212 ensure that the brake 208 can engage the surface of the track $108_1$ or $108_2$. The curved outer braking surface 210 allows more contact points 212 to gradually engage the surface of the tracks $108_1$ or $108_2$ to gradually stop the downward movement of the door 102.

In one embodiment, the contact points 212 may be formed with a series of alternating peaks and valleys or depressions. For example, the contact points 212 may be formed as a series of teeth or in a saw-tooth pattern. However, any pattern may be deployed for the contact points 212 that can be applied to the curved outer braking surface 210. For example, the contacts points 212 may be formed as a file textured surface with a cross-hatch pattern, or any other type of irregular surface that may create friction to help stop downward movement of the door 102.

FIG. 3 illustrates an example of movement of the strap connection member 204, the body 206, and the brake 208 when the door stop mechanism 118 is moved to an engaged position. For example, when tension is lost on the strap 116, the force of the spring 230 may pull the body 206 downward in a direction shown by an arrow 304 towards the protruding member 218 that is in a fixed position on the second side 234 of the bracket 202.

As the body 206 moves downward, the cam surface 240 of the cam 238 may begin to act upon the arm 242 of the brake 208. The cam surface 240 may be cut an angle to form an inclined surface that can cause the arm 242 to rotate around the pivot member 214 as shown by arrow 302. The force of the cam surface 240 acting upon the arm 242 may be greater than the force applied by the torsion spring 216 to cause the arm 242 to rotate.

The rotation of the arm 242 may move the brake 208 towards a surface of the track $108_1$ or $108_2$ in a direction shown by an arrow 306. The contact points 212 of the curved outer braking surface 210 may gradually begin to interact with the surface of track $108_1$ or $108_2$. The contact points 212 may "grab" or "catch" the surface of the track $108_1$ or $108_2$ to arrest or stop the downward movement of the door 102.

When tension in the strap 116 is restored, the force applied by the tension in the strap 116 may act against the spring 230 to pull the strap connection member 204 upward in a direction opposite the arrow 304. The upward movement of the strap connection member 204 may pull the body 206 in the upward direction such that the cam surface 240 moves away from the arm 242 of the brake 208. As a result, the force applied by the torsion spring 216 may allow the arm 242 to rotate in a clockwise direction that is opposite the arrow 302. The rotation of the arm 242 in the clockwise direction may move the brake 208 away from the surface of the track $108_1$ or $108_2$ in a direction opposite the arrow 306 into a disengaged position.

Figure 4:
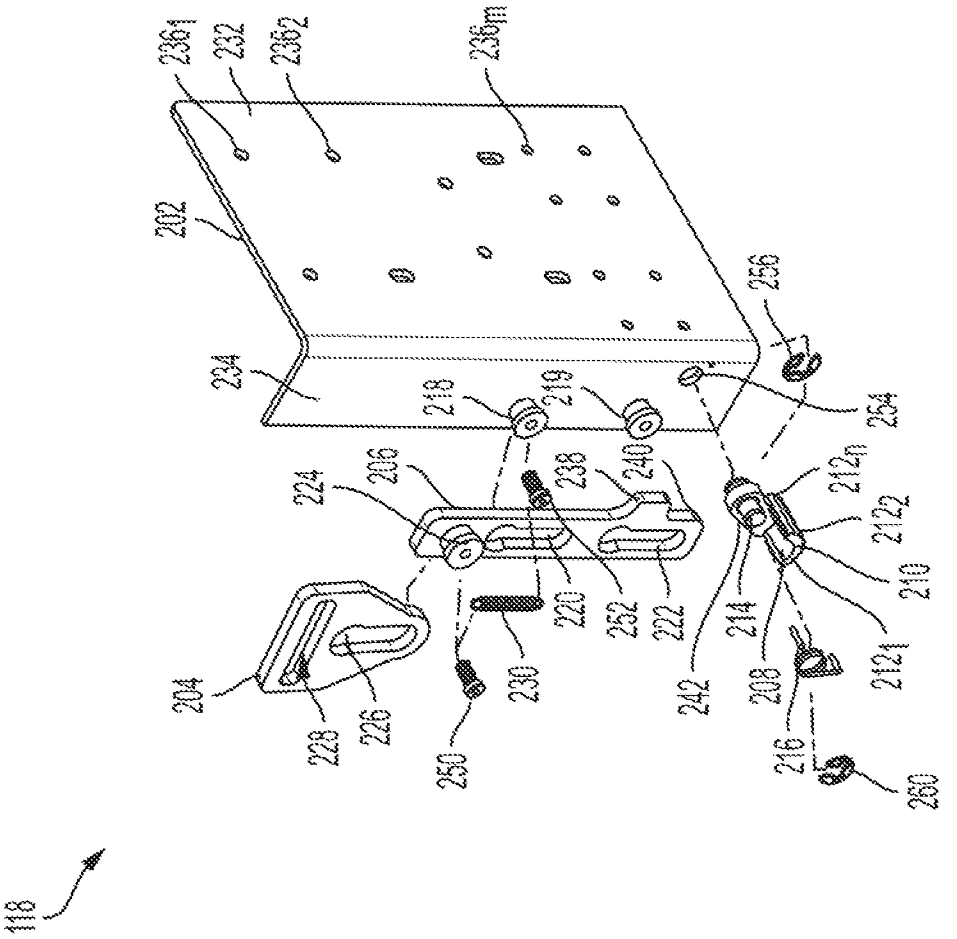
FIG. 4 is an exploded view of the example door stop mechanism of the present disclosure.

FIG. 4 illustrates an example exploded view of the door stop mechanism 118. FIG. 4 illustrates the bracket 202 comprising the first side 232 and the second side 234. As shown in FIG. 4, the second side 234 of the bracket 202 may include protruding members 218 and 219. FIG. 4 also illustrates an opening 254 on the second side 234 of the bracket 202.

The pivot member 214 may be inserted through the opening 254 and held by a clip 256. The torsion spring 216 may be looped around the pivot member 214 and held in place by a clip 260.

The body 206 may be coupled to the second side 234 of the bracket by inserting the protruding member 218 through the slot 220 and the protruding member 219 through the slot 222. The strap connection member 204 may be coupled to the body 206 by inserting the protruding member 224 through the slot 226. The spring 230 may be secured between the protruding member 224 and the protruding member 218. For example, a first screw 250 may be fed through a first loop on a first end of the spring 230 and into a threaded opening of the protruding member 224. A second screw 252 may be fed through a second loop on a second end (opposite the first end) of the spring 230 and into a threaded opening of the protruding member 218. The threaded opening may be located in a center of the protruding member 224 and 218.

FIG. 5 illustrates a close up view of the cam 238 and the cam surface 240. As noted above, the cam surface 240 may be cut or machined to have an inclined surface. In one embodiment, the inclined surface may be formed to have an angle 504. The angle 504 may be measured relative to an axis 502 that runs parallel to an edge 508 of the body 206.

In one embodiment, the angle 504 of the cam surface 240 is set such that the body 206 may move smoothly in a downward direction. In addition, the angle 504 of the cam surface 240 may be set such that the inclined surface of the cam surface 240 gradually acts against the arm 242 of the brake 208 to rotate the arm around the pivot member 214.

In one embodiment, the angle 504 may be greater than 90 degrees. In one embodiment, the angle 504 may be from about 155 degrees to 175 degrees. In one embodiment, the angle 504 may be approximately 165 degrees.

FIGS. 6 and 7 illustrate more detailed views of the brake 208 in a disengaged and in an engaged position, respectively. FIG. 6 illustrates the brake 208 in a disengaged position. In one embodiment, the track $\mathbf{108_1}$ may include a panel 604 that can be coupled to the wall of an opening where the overhead door system 100 is installed. The track $\mathbf{108_1}$ and/or track $\mathbf{108_2}$ may include a surface 602 that interacts with the brake 208 and a wheel track 606. The wheel 106 of the panel $\mathbf{104_1}$ may travel within the wheel track 606 as the door 102 moves between the open and closed positions.

In the disengaged position, the brake 208 moves away from the surface 602. In other words, tension on the strap 116 causes the body 206 to move away from the brake 208 and allows the torsion spring 216 to rotate the brake 208 such that the brake 208 does not contact the surface 602.

FIG. 7 illustrates the brake 208 in the engaged position. When tension on the strap 116 is lost, the spring 130 may cause the body 206 to move downward against the brake 208. The brake 208 may rotate towards the surface 602 as the cam surface 240 acts against the arm of the brake 208. The contact points 212 of the brake 208 may engage or contact the surface 602 to stop movement of the door 102. Further details of how the door stop mechanism is coupled to the door 102 are illustrated in FIG. 9, and discussed below.

Figure 8:
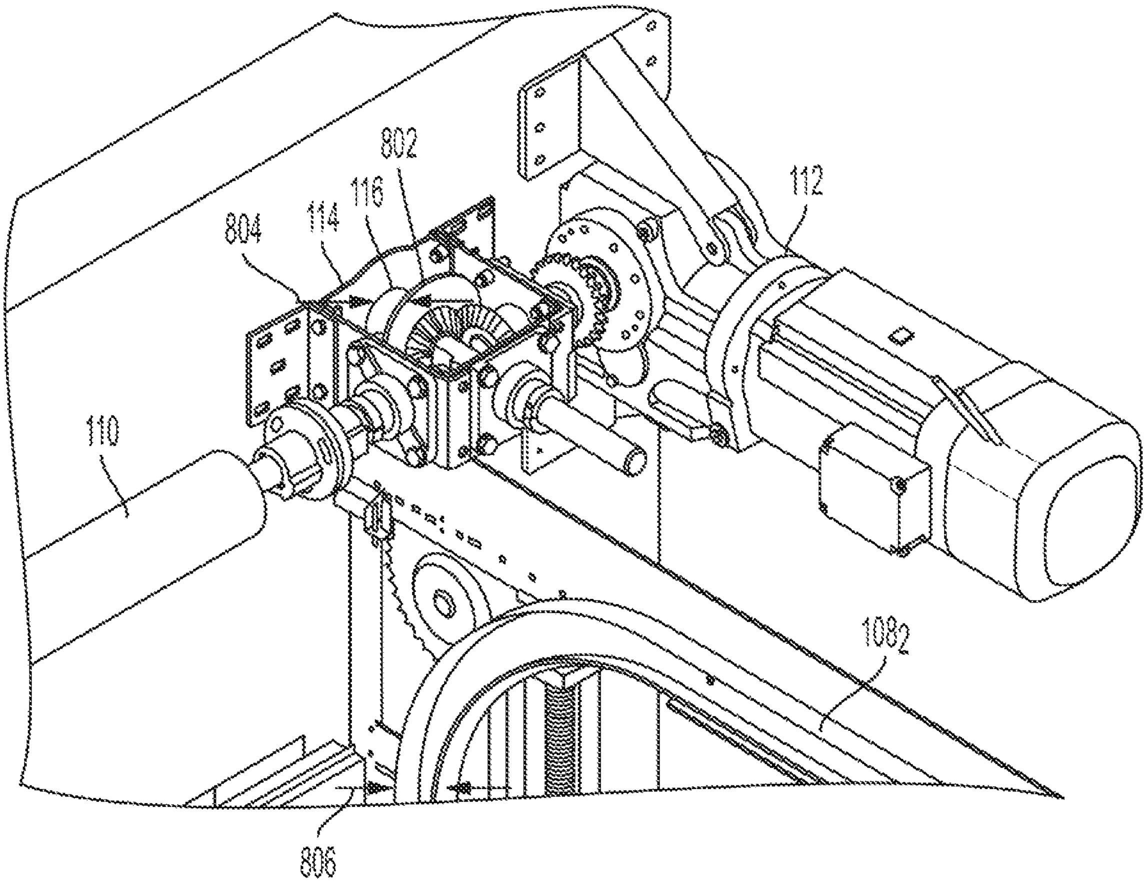
FIG. 8 is an isometric view of an example gear box with a member that is attached to a strap connected to the example door stop mechanism of the present disclosure.

FIG. 8 illustrates a more detailed view of the gear box 114 with a drum 802. In one embodiment, to provide a clean look, the strap 116 may be positioned such that a width 804 of the strap 116 is parallel to a width 806 of the track $\mathbf{108_2}$.

In one embodiment, the drum 802 may include a surface within two circular guides to keep the strap 116 on the surface within the drum 802. The strap 116 may be installed to wrap around the drum 802 and through the slot 228 of the strap connection member 204. Thus, the strap 116 may be installed without adding any twists to the strap 116 that could cause the strap 116 to be tangled or to get stuck in the slot 228 during movement of the door 102.

Figure 9:
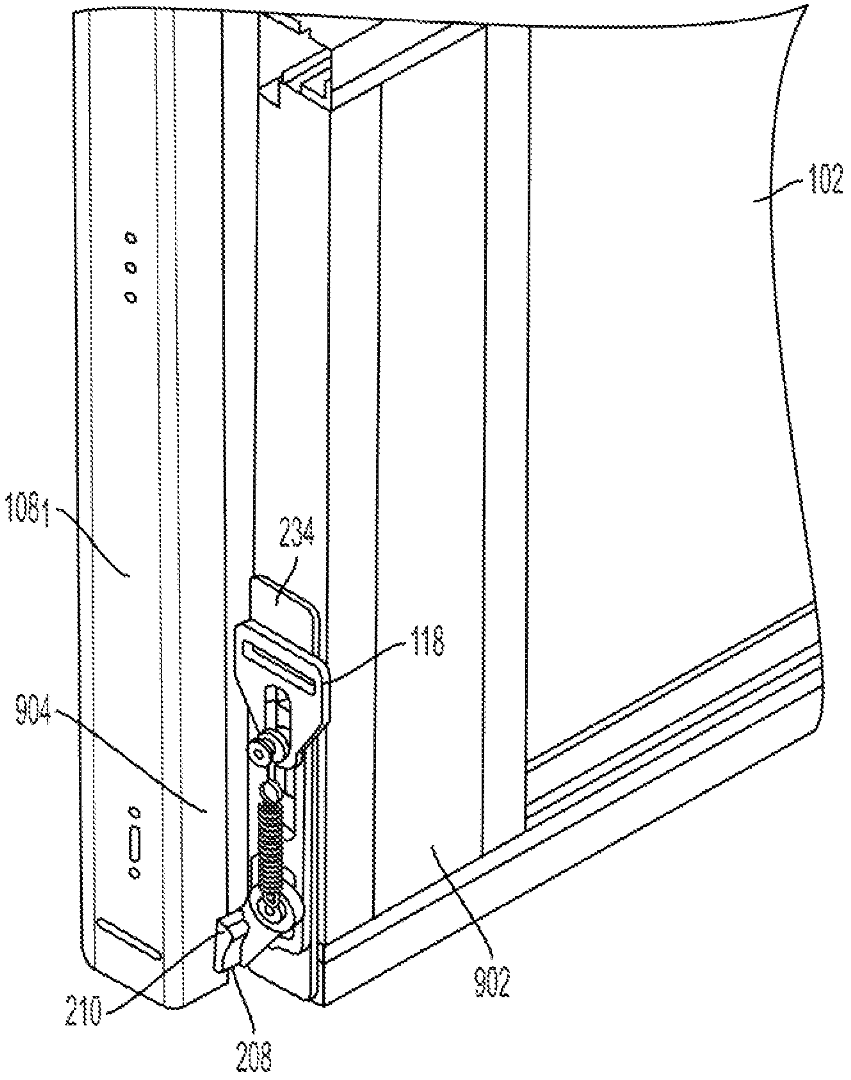
FIG. 9 is a view that illustrates how the door stop mechanism is coupled to a door.

FIG. 9 illustrates a view of how the door stop mechanism 118 is coupled to the door 102. For example, the bracket 202 may be coupled to an inner side of the door 102. FIG. 9 illustrates a view of an exterior side 902 of the door (e.g., the side of the door that faces the outside of the building).

The door stop mechanism 118 may be positioned such that the curved outer braking surface 210 contacts an exterior surface 904 of the first track $\mathbf{108_1}$ and/or the second track $\mathbf{108_2}$ when the brake 208 is in an engaged positioned.

Figure 10:
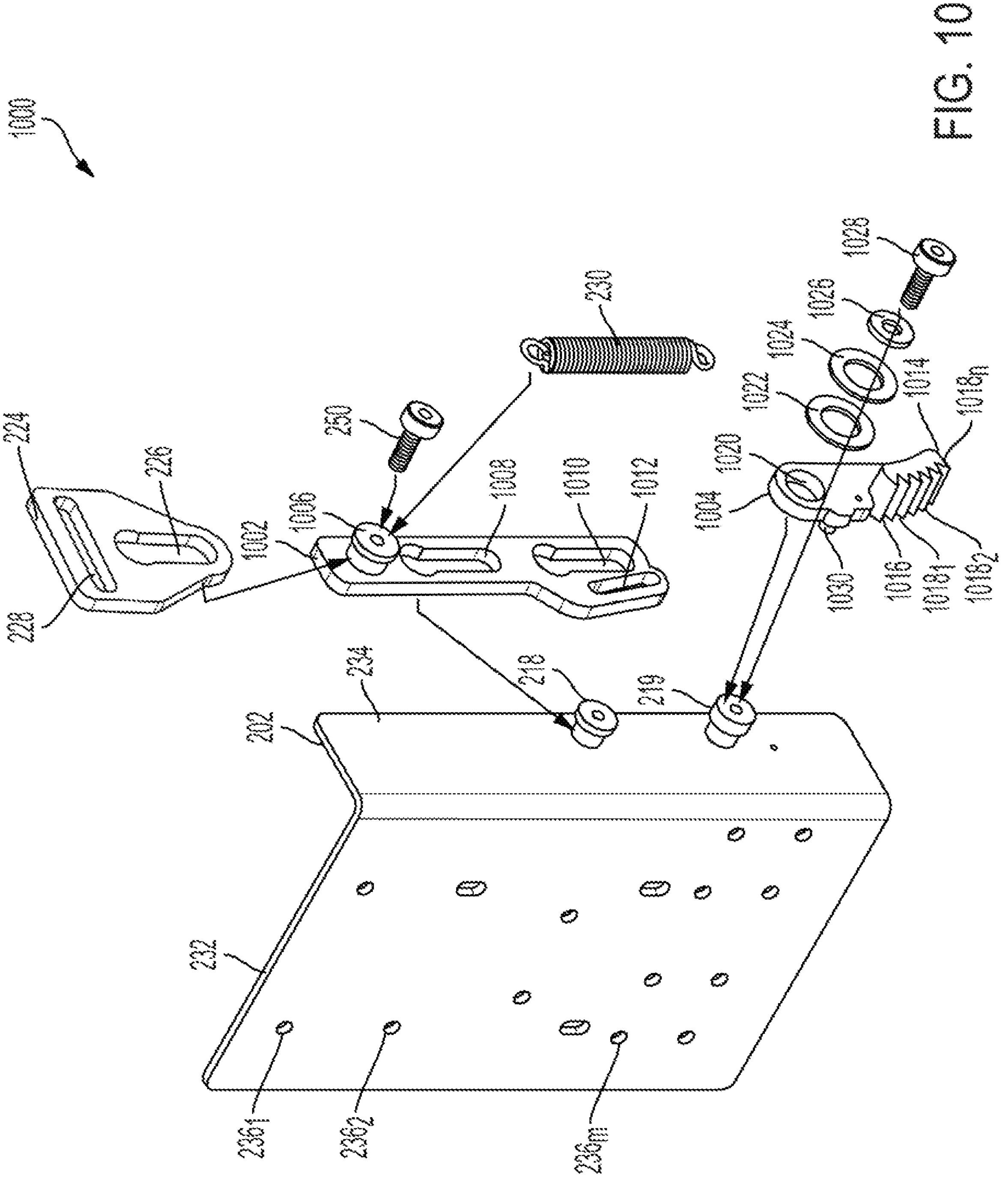
FIG. 10 is an exploded view of another embodiment of the door stop mechanism.

FIG. 10 illustrates an exploded view of another embodiment of the doorstop mechanism 1000. In one embodiment, the door stop mechanism 1000 may include the bracket 202 that is similar to the bracket 202 of the door stop mechanism 118 illustrated in FIG. 4. In one embodiment, the door stop mechanism 1000 may also include the strap connection member 204 similar to the door stop mechanism 118.

However, the door stop mechanism 1000 may include a body 1002 and a brake 1004 that are designed differently than the body 206 and the brake 208 of the door stop mechanism 118. In one embodiment, the body 1002 may include a protruding member 1006. The slot 226 of the strap connection member 204 may be fitted over the protruding member 1006. The spring 230, secured by the screw 250, may interact with the body 1002 and the strap connection member 204 by connection to the protruding member 1006 and the protruding member 219.

In one embodiment, the body 1002 may also include slots 1008 and 1010. The protruding member 218 may be inserted through the slot 1008 and the protruding member 219 may be inserted through the slot 1010.

In one embodiment, the body 1002 may include a guide slot 1012. The guide slot 1012 may interact with the brake 1004 to help guide movement of the brake 1004 between an engaged position and a disengaged position as the body 1002 moves up and down. For example, tension on the strap 116 may cause the body 1002 to move upwards and allow the guide slot 1012 to rotate the braking surface 1016 of the brake 1004 away from the exterior surface 904 of the track $\mathbf{108_1}$ and/or track $\mathbf{108_2}$. When tension is lost on the strap 116, the lost tension may cause the body 1002 to move downwards and allow the guide slot 1012 to rotate the braking surface 1016 of the brake 1004 towards the exterior surface 904 of the track $\mathbf{108_1}$ and/or track $\mathbf{108_2}$.

The guide slot 1012 may have a width that is equal to or slightly larger than a diameter of a protruding member 1030 on the brake 1004. The guide slot 1012 may have a length that allows the brake 1004 to move between the engaged and disengaged position. The guide slot 1012 may be set at an angle relative to the vertical up and down movement of the body 1002 to translate a linear motion of the guide slot 1012 into a rotational movement of the brake 1004.

In one embodiment, the brake 1004 may include an opening 1020. The brake 1004 may be positioned by inserting the protruding member 219 through the slot 1010 of the body 1002 and the opening 1020 of the brake 1004. The protruding member 1030 on the brake 1004 may be inserted into the guide slot 1012.

A screw 1028 may be inserted into the protruding member 219 to secure the brake 1004 against the body 1002 and the bracket 202. In one embodiment, one or more spacers 1022 and 1024 and a washer 1024 may be inserted between the opening 1020 and the screw 1028.

In one embodiment, the brake 1004 may include a braking surface 1016 that is similar to the braking surface 210. For example, the braking surface 1016 may include a textured surface (e.g., teeth $\mathbf{1018_1}$-$\mathbf{1018_n}$ illustrated in FIG. 10) or any other type of textured surface such as a filed textured surface with a cross-hatch pattern.

Thus, the present disclosure provides a mechanical door stop mechanism 118 or 1000 that can be deployed to stop movement of the door 102. As noted above, although the door stop mechanism 118 and 1000 are shown on a single side of the bottom most panel $\mathbf{104_1}$, it should be noted that the door stop mechanism 118 or 1000 may be deployed on both sides or either side of the bottom most panel $\mathbf{104_1}$. Thus, the door stop mechanism 118 or 1000 may be deployed to interact with an outer or exterior surface 904 of the track $\mathbf{108_1}$ and/or track $\mathbf{108_2}$ where the overhead door system 100 is installed.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A door stop mechanism, comprising:

a bracket comprising a first side and a second side coupled together at a right angle, wherein the first side comprises one or more openings to be connected to a bottom most panel of an overhead door and the second side comprising a first protruding member and a second protruding member;

a body, comprising:

a first slot to receive the first protruding member of the bracket;

a second slot to receive the second protruding member of the bracket; and a third protruding member, wherein the third protruding member, the first slot, and the second slot are aligned in a vertical direction;

a connection member, comprising a third slot to receive the third protruding member of the body;

a spring coupled to the body and to the connection member; and a brake positioned adjacent to the body, wherein the brake moves between an engaged position via a spring force of the spring that causes the body to interact with the brake such that the brake contacts a track of the overhead door and a disengaged position via a force that acts against the spring force to pull the body away from the brake such that the brake moves away from the track to allow the overhead door to move.

2. The door stop mechanism of claim 1, wherein the connection member further comprises:

a slot to receive a strap.

3. The door stop mechanism of claim 2, wherein the spring is coupled to the third protruding member and the first protruding member.

4. The door stop mechanism of claim 1, the body further comprising:

a cam surface to engage a back side of the brake, wherein movement of the cam surface causes the brake to rotate between the engaged position and the disengaged position.

5. The door stop mechanism of claim 1, wherein the brake comprises:

a curved braking surface, wherein an outer side of the curved braking surface that faces the track of the overhead door comprises a plurality of contact points to contact the track.

6. The door stop mechanism of claim 5, wherein the plurality of contact points comprises teeth formed into the outer side of the curved braking surface.

7. The door stop mechanism of claim 1, wherein the brake is rotatably coupled via a torsion spring to the bracket.

8. The door stop mechanism of claim 1, wherein the body further comprises:

a guide slot to receive a brake protruding member on the brake.

9. The door stop mechanism of claim 8, wherein the brake comprises:

an opening to receive the second protruding member of the bracket; and the brake protruding member to be inserted into the guide slot of the body.

10. A door stop mechanism, comprising:

a bracket comprising a first side and a second side coupled together at approximately 90 degrees, wherein the first side comprises one or more openings to be connected to a bottom most panel of an overhead door and the second side comprising a first protruding member and a second protruding member;

a body, comprising:

a first slot to receive the first protruding member of the bracket;

a second slot to receive the second protruding member of the bracket; and a third protruding member, wherein the third protruding member the first slot, and the second slot are aligned in a vertical direction;

a connection member, comprising a third slot to receive the third protruding member of the body;

a spring coupled to the body and to the connection member; and a brake positioned adjacent to the body;

a drum; and a strap coupled to the drum and to the connection member, wherein tension applied to the strap causes the body to move away from the brake to move to a disengaged position such that the brake moves away from a track of the overhead door, and a loss in tension to the strap causes the body to interact with the brake to move the brake to an engaged position such that the brake moves towards the track and contacts the track.

11. The door stop mechanism of claim 10, wherein a width of the strap is parallel to a width of the body and the connection member.

12. The door stop mechanism of claim 10, wherein the body further comprises:

a guide slot.

13. The door stop mechanism of claim 12, wherein the connection member further comprises:

a slot to receive the strap.

14. The door stop mechanism of claim 12, wherein the brake comprises:

an opening to receive the second protruding member of the bracket; and a brake protruding member to be inserted into the guide slot of the body.

15. An overhead door system, comprising:

a track system;

an overhead door movably coupled to the track system, wherein the overhead door comprises a plurality of panels;

a shaft located over the overhead door;

a drum coupled to a first end of the shaft;

a motor coupled to the first end of the shaft to rotate the shaft to open and close the overhead door and rotate the drum;

a door stop mechanism coupled to a bottom most panel of the plurality of panels;

a strap, wherein a first end of the strap is coupled to the drum and a second end of the strap is coupled to the door stop mechanism; and a bracket coupled to the bottom most panel, wherein the bracket comprises a panel mounting surface and a door stop mechanism mounting surface coupled together perpendicularly, wherein the door stop mechanism mounting surface comprises a first protruding member and a second protruding member, wherein the door stop mechanism comprises:

a body, comprising a first slot to receive the first protruding member of the bracket, a second slot to receive the second protruding member of the bracket, a third protruding member, and a guide slot, wherein the third protruding member, the first slot, and the second slot are aligned in a vertical direction;

a strap connection member coupled to the second end of the strap, wherein the strap connection member comprises a third slot to receive the third protruding member of the body;

a spring coupled to the body and the strap connection member; and a brake coupled to the second protruding member of the bracket and positioned adjacent to the body, wherein the brake comprises a brake protruding member that is inserted into the guide slot of the body, wherein tension applied to the strap causes the body to move away from the brake and causes the brake to rotate to a disengaged position such that the brake moves away from an exterior surface of the track system, and a loss in tension to the strap causes the body to move towards the brake and causes the brake to rotate to an engaged position such that the brake moves towards the track system and contacts the exterior surface of the track system.

16. The overhead door system of claim 15, wherein the brake comprises:

a first end comprising an opening, wherein the second protruding member of the bracket is inserted through the opening; and a second end comprising a curved braking surface, wherein an outer side of the curved braking surface comprises a plurality of teeth to contact the track system.

17. The overhead door system of claim 16, wherein a screw is inserted through the opening of the first end of the brake and into the second protruding member to secure the brake against the body and the bracket.

18. The overhead door system of claim 15, wherein the guide slot is set at an angle relative to a vertical movement of the body to translate a linear motion of the guide slot into a rotational movement of the brake.

* * * * *